United States Patent
Awada et al.

(10) Patent No.: US 11,943,674 B2
(45) Date of Patent: Mar. 26, 2024

(54) CONDITIONAL HANDOVER OF MASTER NODE IN THE PRESENCE OF SECONDARY NODE

(71) Applicant: Nokia Technologies Oy, Espoo (FI)

(72) Inventors: Ahmad Awada, Munich (DE); Krzysztof Kordybach, Pulawy (PL); Jedrzej Stanczak, Wroclaw (PL); Elena Virtej, Espoo (FI); Tero Henttonen, Espoo (FI); Ingo Viering, Munich (DE)

(73) Assignee: Nokia Technologies Oy, Espoo (FI)

( * ) Notice: Subject to any disclaimer, the term of this patent is extended or adjusted under 35 U.S.C. 154(b) by 422 days.

(21) Appl. No.: 17/173,143

(22) Filed: Feb. 10, 2021

(65) Prior Publication Data

US 2021/0258843 A1 Aug. 19, 2021

Related U.S. Application Data

(60) Provisional application No. 62/976,251, filed on Feb. 13, 2020.

(51) Int. Cl.
*H04W 36/00* (2009.01)
*H04W 48/08* (2009.01)

(52) U.S. Cl.
CPC . *H04W 36/00837* (2018.08); *H04W 36/0069* (2018.08); *H04W 48/08* (2013.01)

(58) Field of Classification Search
CPC ....... H04W 36/00837; H04W 36/0069; H04W 48/08; H04W 36/34
See application file for complete search history.

(56) References Cited

U.S. PATENT DOCUMENTS

| 10,979,941 | B2 | 4/2021 | Wang et al. | |
| 11,412,423 | B2* | 8/2022 | Teyeb | H04W 36/0033 |
| 11,477,707 | B2* | 10/2022 | Paladugu | H04W 36/0061 |
| 2018/0035339 | A1 | 2/2018 | Mitsui et al. | |
| 2018/0332507 | A1 | 11/2018 | Fujishiro et al. | |
| 2021/0105681 | A1* | 4/2021 | Paladugu | H04W 36/00837 |
| 2022/0086704 | A1* | 3/2022 | Futaki | H04W 36/36 |
| 2022/0295366 | A1* | 9/2022 | Teyeb | H04W 76/30 |
| 2022/0338089 | A1* | 10/2022 | Kim | H04W 36/0069 |

(Continued)

FOREIGN PATENT DOCUMENTS

WO WO-2021162507 A1 * 8/2021 ........ H04W 36/0069

OTHER PUBLICATIONS

3GPP TSG-RAN WG2 Meeting #107 R2-1911331; Prague, Czech, Aug. 26-30, 2019; Source: NTT DOCOMO, Inc. Title: Study on application of CHO mechanism to Conditional. pages.*

(Continued)

*Primary Examiner* — Ahmed Elallam
(74) *Attorney, Agent, or Firm* — Mintz Levin Cohn Ferris Glovsky P.C.

(57) ABSTRACT

Methods and apparatus, including computer program products, are provided for conditional handovers. In some example embodiments, there may be provided a method including sending, by a first node serving a user equipment, a message to a second node, the message including an indication of whether a conditional cell change is prohibited at the second node; and receiving, by the first node, an acknowledgment in response to the message.

20 Claims, 8 Drawing Sheets

(56) References Cited

U.S. PATENT DOCUMENTS

| | | | | |
|---|---|---|---|---|
| 2022/0369172 A1* | 11/2022 | Hwang | ............ | H04W 36/0069 |
| 2022/0369173 A1* | 11/2022 | Deng | .................... | H04W 76/27 |
| 2022/0369181 A1* | 11/2022 | Selvaganapathy | ........................... H04W 36/0069 | |
| 2022/0377629 A1* | 11/2022 | Rugeland | .......... | H04W 36/0079 |
| 2022/0386195 A1* | 12/2022 | Ishii | ................. | H04W 36/0038 |
| 2022/0386207 A1* | 12/2022 | Rugeland | .............. | H04W 36/36 |
| 2022/0394584 A1* | 12/2022 | Ishii | ...................... | H04W 76/19 |
| 2022/0408323 A1* | 12/2022 | Ishii | ................. | H04W 36/0055 |
| 2023/0045700 A1* | 2/2023 | Wu | ................... | H04W 36/0069 |
| 2023/0046878 A1* | 2/2023 | Hsieh | .................... | H04W 36/30 |
| 2023/0047744 A1* | 2/2023 | Wu | ................... | H04W 36/0069 |

OTHER PUBLICATIONS

3GPP TSG-RSN WG2 Meeting #108 R2-1915962, Reno, USA, Nov. 18-22, 2019 Agenda item: 6.9.4; Source: CATT (Rapporteur); pp. 50.*

3rd Generation Partnership Project, Technical Specification Group Radio Access Network; Evolved Universal Terrestrial Radio Access Network (E-UTRAN); X2 application protocol (X2AP) (Release 15), 3GPP TS 36.423 v15.8.0 (Dec. 2019), 422 pages.

3rd Generation Partnership Project, Technical Specification Group Radio Access Network; NR; NR and NG-RAN Overall Description; Stage2 (Release 15), 3GPP TS 38.300 v15.8.0 (Dec. 2019), 99 pages.

3rd Generation Partnership Project, Technical Specification Group Radio Access Network; NG-RAN; Xn application protocol (XnAP); (Release 15), 3GPP TS 38.423 v15.6.0 (Dec. 2019), 315 pages.

* cited by examiner

```
┌─────────────────────────────────────────────────────────────────────────┐
│ Determine for a dual connectivity connection whether to allow a         │
│ conditional cell change of a secondary cell (e.g., a CPC) or allow a    │
│ conditional handover of the master (CHO) 205                            │
└─────────────────────────────────────────────────────────────────────────┘
                                      │
┌─────────────────────────────────────────────────────────────────────────┐
│ Send to a secondary node a message including an indication of whether   │
│ CPC is prohibited 210                                                   │
└─────────────────────────────────────────────────────────────────────────┘
                                      │
┌─────────────────────────────────────────────────────────────────────────┐
│ Receive from the secondary node, a message acknowledging the request    │
│ message 215                                                             │
└─────────────────────────────────────────────────────────────────────────┘
                                      │
┌─────────────────────────────────────────────────────────────────────────┐
│ Send a message to the secondary node to modify a CPC state at the       │
│ secondary node 230                                                      │
└─────────────────────────────────────────────────────────────────────────┘
```

```
┌─────────────────────────────────────────────────────────────────────┐
│ Receive, at a secondary node, a message including an indication of  │
│ whether CPC is prohibited ( 250                                     │
└─────────────────────────────────────────────────────────────────────┘
                                    │
┌─────────────────────────────────────────────────────────────────────┐
│ Send, by the secondary node, a message acknowledging the request    │
│ message 260                                                         │
└─────────────────────────────────────────────────────────────────────┘
                                    │
┌─────────────────────────────────────────────────────────────────────┐
│ Operate, at the secondary node, in a CPC prohibited or allowed mode │
│ 270 270                                                             │
└─────────────────────────────────────────────────────────────────────┘
                                    │
┌─────────────────────────────────────────────────────────────────────┐
│ Receive a message to modify a CPC state at the secondary node 280   │
└─────────────────────────────────────────────────────────────────────┘
```

CONDITIONAL HANDOVER OF MASTER NODE IN THE PRESENCE OF SECONDARY NODE

CROSS-REFERENCE TO RELATED APPLICATION

This application claims the benefit of U.S. Provisional Patent Application No. 62/976,251, filed Feb. 13, 2020, which is incorporated by reference herein in its entirety.

FIELD

The subject matter described herein relates to cellular systems and, in particular, mobility in a cellular communication network.

BACKGROUND

As the use of cellular systems including 5G increases, the demands on the cellular system will increase. In some instances, the cellular system may offload traffic to non-cellular systems, such as wireless access networks including WiFi and other types of wireless and/or wired technologies. Likewise, traffic may be returned to the cellular system after an offload to the non-cellular system.

Dual connectivity refers to a user equipment (for example, a cell phone, a smartphone, a tablet, IoT device, or other wireless device) that couples to a first cell, such as a macrocell served by a primary, or master, node (e.g., a master base station), and that further couples to one or more secondary cells such as a small cell served by a secondary node (e.g., secondary base station). One of the secondary cells may be designated as a primary secondary cell. Dual connectivity may thus be used in cellular networks to increase the capacity of the cellular network on a per user equipment basis by enabling access to one or more secondary nodes (which may serve picocells, macrocell, femtocells, and/or wireless local area networks). Moreover, dual connectivity including resource allocation may be under the control of the cellular network. Some aspects of dual connectivity have been described in standards, such as TS 36.300, TS 36.423, TS 36.413 for LTE, or TS 37.340, TS 38.423 for NR, and/or the like.

SUMMARY

Methods and apparatus, including computer program products, are provided for handovers.

In some example embodiments, there may be provided a method including sending, by a first node serving a user equipment, a message to a second node, the message including an indication of whether a conditional cell change is prohibited at the second node; and receiving, by the first node, an acknowledgment in response to the message.

In some variations, one or more of the features disclosed herein including the following features can optionally be included in any feasible combination. The first node is configured to become a master node. The second node is configured to become a secondary node in order to serve the user equipment in dual connectivity. The first node includes a master node. The second node includes a secondary node. The master node and the secondary node both serve the user equipment in dual connectivity. The message includes a request message, a modification message, a secondary node addition request, and/or a secondary node modification request. The message is sent during a conditional handover process between the master node and a target master node. The first node includes the target master node. The second node includes the secondary node of the dual connectivity with the source master node, the message enabling a dynamic coordination of the conditional handover and the conditional cell change. The indication includes a first indication that the conditional cell change is prohibited, a second indication of allowing the conditional cell change, and/or a third indication of stopping the conditional cell change. The conditional cell change includes a change of at least one cell served by the secondary node. The indication of whether the conditional cell change is prohibited or allowed is for a time period defined to end at an expiry of the time period or at an event. The second node sends an acknowledgment indicating that the second node accepts a prohibition of the conditional cell change or rejects the prohibition. The message modifies a state of secondary node to prohibit the conditional cell change, allows the conditional cell change, and/or stops the conditional cell change. A determination may be made regarding whether to allow a conditional cell change of the secondary node or allow a conditional handover of the master node. The master node initiates the conditional handover to a target master node causing the target master node to send a second message to add another secondary node, the second message indicating that the addition of the other secondary node is associated with the conditional handover.

In some example embodiments, there may be provided a method including receiving, from a first node serving a user equipment, a message including an indication of whether a conditional cell change is prohibited at a second node; and sending, by the second node, an acknowledgment to the first node, the acknowledgement sent in response to the message.

In some variations, one or more of the features disclosed herein including the following features can optionally be included in any feasible combination. The second node may operate in a conditional cell change prohibited state or a conditional cell change allowed state based on the received message and/or the acknowledgment sent. The first node includes a master node. The second node includes a secondary node. The master node and the secondary node both serve the user equipment in dual connectivity. The message includes a request message, a modification message, a secondary node addition request, and/or a secondary node modification request. The message is sent during a conditional handover process between the master node and a target master node. The first node includes the target master node. The second node includes the secondary node of the dual connectivity with the source master node, the message enabling a dynamic coordination of the conditional handover and the conditional cell change. The indication includes a first indication that the conditional cell change is prohibited, a second indication of allowing the conditional cell change, and/or a third indication of stopping the conditional cell change, wherein the conditional cell change comprises a change of at least one cell served by the secondary node. The indication of whether the conditional cell change is prohibited or allowed is for a time period defined to end at an expiry of the time period or at an event. The acknowledgment indicates that the secondary node accepts a prohibition of the conditional cell change or rejects the prohibition. The message modifies a state of secondary node to prohibit the conditional cell change, allows the conditional cell change, and/or stops the conditional cell change.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

For enhancing mobility robustness, 3GPP Release 16 may provide a "Conditional Handover" (CHO) as described in 3rd Generation Partnership Project; Technical Specification Group Radio Access Network; Evolved Universal Terrestrial Radio Access (E-UTRA) and NR; Multi-connectivity; Stage 2 (Release 16) as well as other versions of this document, hereinafter 3GPP TS 37.340. In a CHO, one or more handover target cells are prepared in advance based on a measurement report from a user equipment. The user equipment may access a handover target cell based on a trigger (e.g., event or radio measurement of conditions) configured by a radio access network to avoid radio link failures due to a failed handover command. In the case of dual connectivity, CHO refers to a source master (or primary) node handover to another, target master node, or, in the case of an intra-node (same master node) handover between a source cell and target cell. In the case of dual connectivity, a change of a serving cell within a secondary node or from a source secondary node to a target secondary node may also be performed. This secondary cell change, if done in conditional manner, is referred to as a Conditional Primary secondary cell (PSCell) Change (CPC). In the case of dual connectivity, if there is a CHO occurring while a CPC is occurring, this may cause issues with loss of data, connectivity, etc. absent some form of coordination.

In some example embodiments, there may be provided a way to coordinate CHO and CPC in order to avoid that they occur at the same or similar time. As noted, if a CHO is initiated while a CPC is in progress for example (or vice versa), it may cause problems. Moreover, there may be provided improvements for CHO of a master node (MN) in the presence of a secondary node (SN).

In some example embodiments, a first base station such as a master node (which is the master node after the dual connectivity has been established) may be configured to support a conditional handover. When a second base station is being set up as a secondary node for dual connectivity, the second base station may receive information related to the conditional handover configuration of the first base station. When this information indicates that a conditional handover (CHO) may be executed, for example, the secondary base station knows that CPC is not allowed. When the information indicates that a CHO is not planned, however, the secondary base station knows that CPC is allowed.

In some example embodiments, a message, such as a secondary node addition request (e.g., an "SgNB ADDITION REQUEST" or "S-NG-RAN NODE ADDITION REQUEST") used to add a secondary node for dual connectivity, is extended to include an indication of whether the secondary node is allowed to use CPC (or, e.g., whether the secondary node is not to use CPC.

Alternatively, or additionally, a message, such as the secondary node addition request (e.g., an "SgNB ADDITION REQUEST" or "S-NG-RAN NODE ADDITION REQUEST"), is extended to include an indication that an existing secondary node will stop an ongoing CPC processes (which was initiated prior to receipt of the message).

Alternatively, or additionally, a message, such as the secondary node addition request ("S-Node Addition Request"), is extended to include an indication that the "S-Node Addition Request" is triggered by a conditional master node handover.

In some example embodiments, a master node may decide per dual connectivity connection whether CPC or CHO is to be used. If the master node determines that CHO is more relevant (e.g., if the user equipment is closer to a cell boundary between master nodes), the master node may then instruct the future secondary node to not use CPC (e.g., an indication representative of CPC being prohibited such as a "CPC Prohibited"). If the master node determines that CPC is more relevant (e.g., if the user equipment is closer to a cell boundary between secondary nodes), the target master node may choose to allow CPC in the future secondary node.

In some embodiments, the master node (MN) may be configured to not use CHO after allowing CPC in the secondary node.

In some embodiments, the extension of the message, such as the "SgNB ADDITION REQUEST" or the "S-NG-RAN NODE ADDITION REQUEST", may be a flag or indicator that CPC is allowed in the receiving secondary node. For instance, the message may include an indicator such as a "1" to indicate that CPC is prohibited, and an indicator of "0" may indicate that CPC is allowed.

In some embodiments, the secondary node receives a message, such as the S-Node Addition Request. This message includes an indication that CPC is prohibited and thus the secondary node may not use CPC after receiving that message, and/or may stop using it, if already configured for the connection. In some embodiments, if the message does not include CHO related information (e.g., an indication that CPC is prohibited), the secondary node may decide that CPC is allowed. For example, the CHO related information (e.g., an indication that that CPC is prohibited) may be missing from the message, when the target master node is not supporting CHO or for other reasons.

In some embodiments, the secondary node may reject the request message to add the secondary node (e.g., the S-Node Addition Request), if the secondary node is not willing to accept the CPC prohibition. For example, the secondary node may know (e.g., from the past failures, etc.) that PSCell changes are very risky and require improvements via a CPC. When this is the case, the secondary node may reject the request message prohibiting CPC. When rejected, the secondary node may add a cause indicative of the rejection, and respond with a response message (e.g., "S-Node Addition Request Reject") that indicates the reason for rejecting the CPC prohibition. As a consequence, the master node may re-evaluate the CPC prohibition and may send out a new S-Node Addition Request allowing the CPC.

In some embodiments, if the master node changes the CPC or CHO decision after sending out the request message (e.g., the S-Node Addition Request), the master node may update the secondary node using a modification message, such as an extended "SgNB MODIFICATION REQUEST" or "S-NG-RAN NODE MODIFICATION REQUEST" which includes the noted CHO related information. If for example the user equipment moves from a master node boundary to a secondary node boundary, the master node may decide to remove the CPC prohibition and allow a future CPC by sending to the secondary node the modification message, such as the S-Node Modification Request indicating CPC allowed.

In some embodiments, the secondary node (which received a CPC prohibit) may stop an ongoing CPC processes (e.g., by releasing the CPC configurations inside the UE) when receiving a request message, such as a secondary node modification or addition request (e.g., an S-Node Modification Request or an S-Node Addition Request). This may happen in at least two example situations. First, the secondary node may stop the ongoing CPC process if the master node sends a modification request (e.g., S-Node Modification Request) prohibiting CPC in the secondary node (which has had CPC initiated previously). Here, it might be desirable that the secondary node stops the CPC. Second, if the master node initiates a conditional handover to another candidate target master node without a secondary node change, the candidate target master node may send, for example, an S-Node Addition Request to the existing secondary node to set up the new dual connectivity session. When this is the case, the CPC may have already been initiated by the secondary node SN (e.g., if source master node has originally allowed CPC). In this case, it may even be essential that the secondary node stops CPC as the master node cannot initiate CHO otherwise. This situation may also be resolved by sending for example the S-Node Modification Request (and stopping CPC then).

In some embodiments, the secondary node may stop an ongoing CPC implicitly whenever it receives a CPC prohibition, without the need of a separate indication for stopping ongoing CPC. In some embodiments, the secondary node may stop an ongoing CPC whenever the secondary node receives explicit information (e.g., separate indication such as a "1" in the message mapped to CPC stop, in addition or instead of the indication that prohibits the CPC).

In some embodiments, the CHO related information may be a temporary prohibition of CPC. For example, the CHO related information may include an indication, such as a value indicating a time period for which CPC is prohibited, and after the expiry of the time period, CPC is allowed to be used again. Likewise, the CHO related information may trigger a timer, after the expiry of which CPC is allowed again. Alternatively, or additionally, the CPC prohibition may be until an event, such as when an ongoing master node conditional handover process is completed and/or the secondary node is released by the source master node.

When a master node (which is a configured with a secondary node as part of the dual connectivity) initiates a conditional handover (CHO) which includes a corresponding secondary node change (e.g., by sending a handover request to a target master node), the target master node may send a subsequent secondary node addition message (e.g., the S-Node Addition Request) that includes CHO related information that indicates that this secondary node addition is part of a conditional handover (CHO) of a master node. For example, the target master node may send to the secondary node the secondary node addition request message which includes the noted CHO related information. In response, the secondary node may react to this secondary node addition message (which includes information which indicates that this secondary node addition is part of a conditional handover (CHO) of a master node) by reserving fewer resources (e.g., radio resources, control channels, backhaul capacity, and/or the like) when compared to a legacy conditional master node handover with secondary node change which is not using the CHO related information.

In some embodiments, the information (which indicates that this secondary node addition is part of a conditional handover (CHO) of a master node) is combined with the information which indicates whether CPC is allowed or prohibited at the secondary node. For example, a bitmap of, for example, 2 bits may be used, so that the first bit indicates whether CPC is prohibited and the second bit indicates whether the handover procedure is part of a conditional handover (CHO) of the master node.

Although some of the examples refer to specific types of messages, such as the S-Node Modification Request or an S-Node Addition Request, other types of messages may be used including messages used to dynamically add or modify nodes or cells as part of the dual connectivity process. Moreover, although some of the examples refer to an inter-node handover between nodes (e.g., master base station to master base station), the handover may be intranode (e.g., same master base station), in which case the same node handles the handover from a first cell serving a UE to a second cell serving the UE. Likewise, although some of the examples refer to an internode cell change (e.g., from a secondary node to another secondary node), the secondary node cell change may also be intranode, in which case the same secondary node handles the cell change.

Figure 1A:
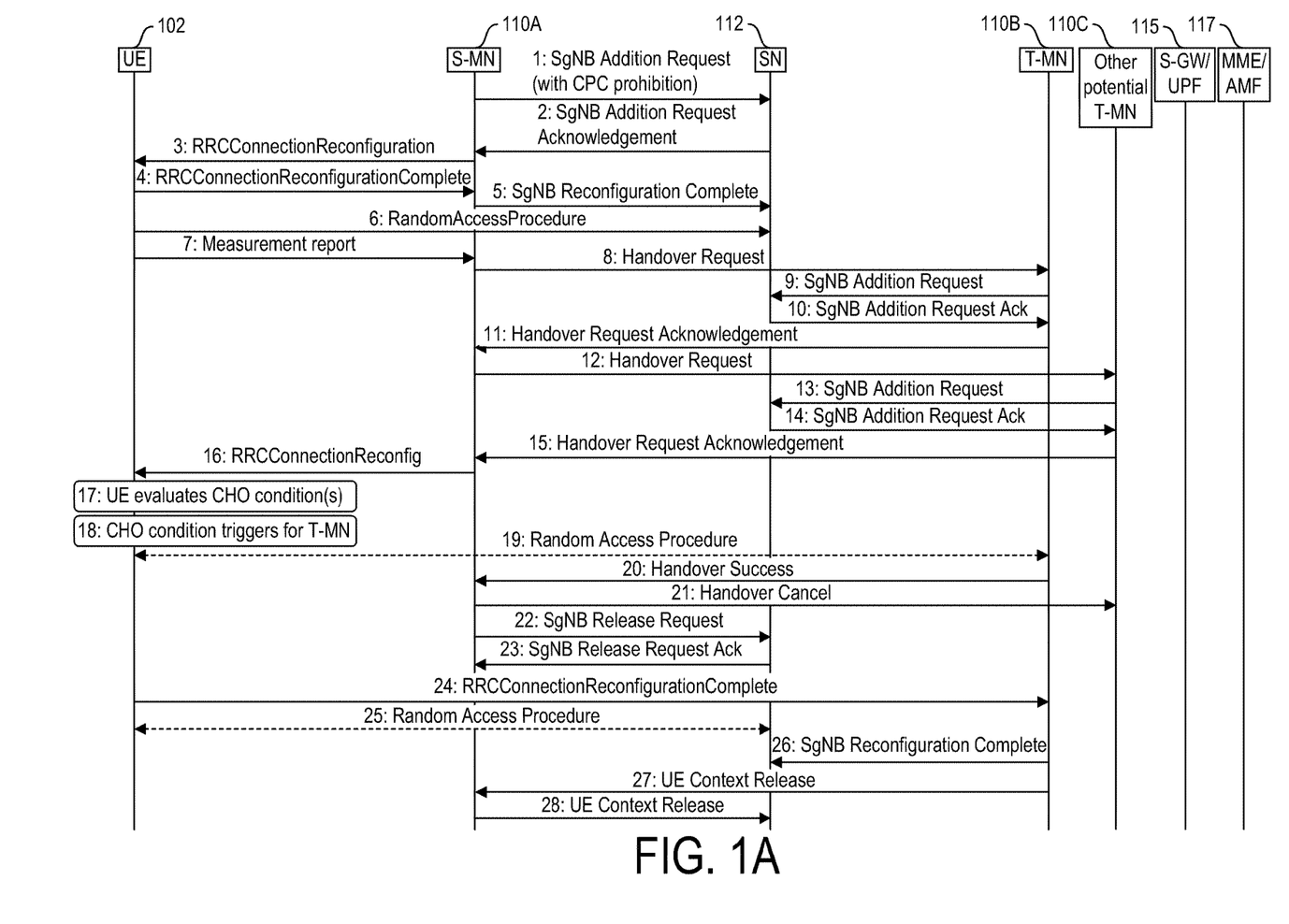
FIGS. 1A-D depict examples of signaling diagrams to enable the coordination of conditional handovers, in accordance with some example embodiments.

FIG. 1A depicts an example of a signaling diagram between a user equipment 102, a source master node 110A, a secondary node 112, a target master node 110B, one or more other potential target master nodes 112C, a first core network node 115 (e.g., a serving gateway (S-GW) and/or user plane function), and a second core network node 117 (e.g., a mobility management entity (MME) and/or access and mobility management), in accordance with some example embodiments.

In the example of FIG. 1A, the UE is first configured with dual connectivity with source master node 110A and secondary node 112 and then performing at least a portion of the conditional handover process with one or more target master nodes 110B-C. The process at FIG. 1A may be similar in some respects to 3GPP, 37.340, where a legacy handover of the master station occurs without a secondary node change but FIG. 1A further includes messages extended as noted herein to enable coordination between CPC and CHO.

At 1, the source master node 110A may send to at least one secondary node 112 a message, such as a message requesting the addition of a secondary node (e.g., the "SgNB Addition Request"). In accordance with some example embodiments, this message may include the noted CHO related information. For example, the CHO related information may include an indication of whether CPC is prohibited or allowed at the secondary node. To illustrate further, the indication may represent a flag or other indicate of CPC prohibited (e.g., a "1" bit value) or CPC not prohibited (e.g., a "0" bit value). In the example of FIG. 1A, the CHO related information requests that the secondary node 112 prohibits CPC due to the source master 110 planning to perform (at for example, 8 below) CHO.

At 2, the secondary node 112 may send to the source master node 110A an acknowledgement message (e.g., the "SgNB Addition Request Acknowledgement"), in accordance with some example embodiments. The acknowledgement message may indicate to the source master node that the CPC prohibition is accepted. As noted however, the secondary node may reject to prohibit CPC. When this is the case, the secondary node 112 may not send an acknowledgement or send a response message indicating a rejection (e.g., a cause code indicting rejection or a secondary node addition request reject message that indicates the reason for rejecting the CPC prohibition).

At 8, the source master node 110A may send a handover request to the target master node 110B and, in particular, a conditional master node handover request without a change in the secondary node 112 (e.g., the secondary node 112 remains the same before and after the CHO to target master node 110B).

In some embodiments, if the secondary node 112 (which has received the CPC prohibition) wants to do a change of the PSCell, the secondary node 112 may use the prior PSCell change procedure (as described in e.g. 37.340) but not the conditional PSCell (CPC) procedure.

Figure 1B:
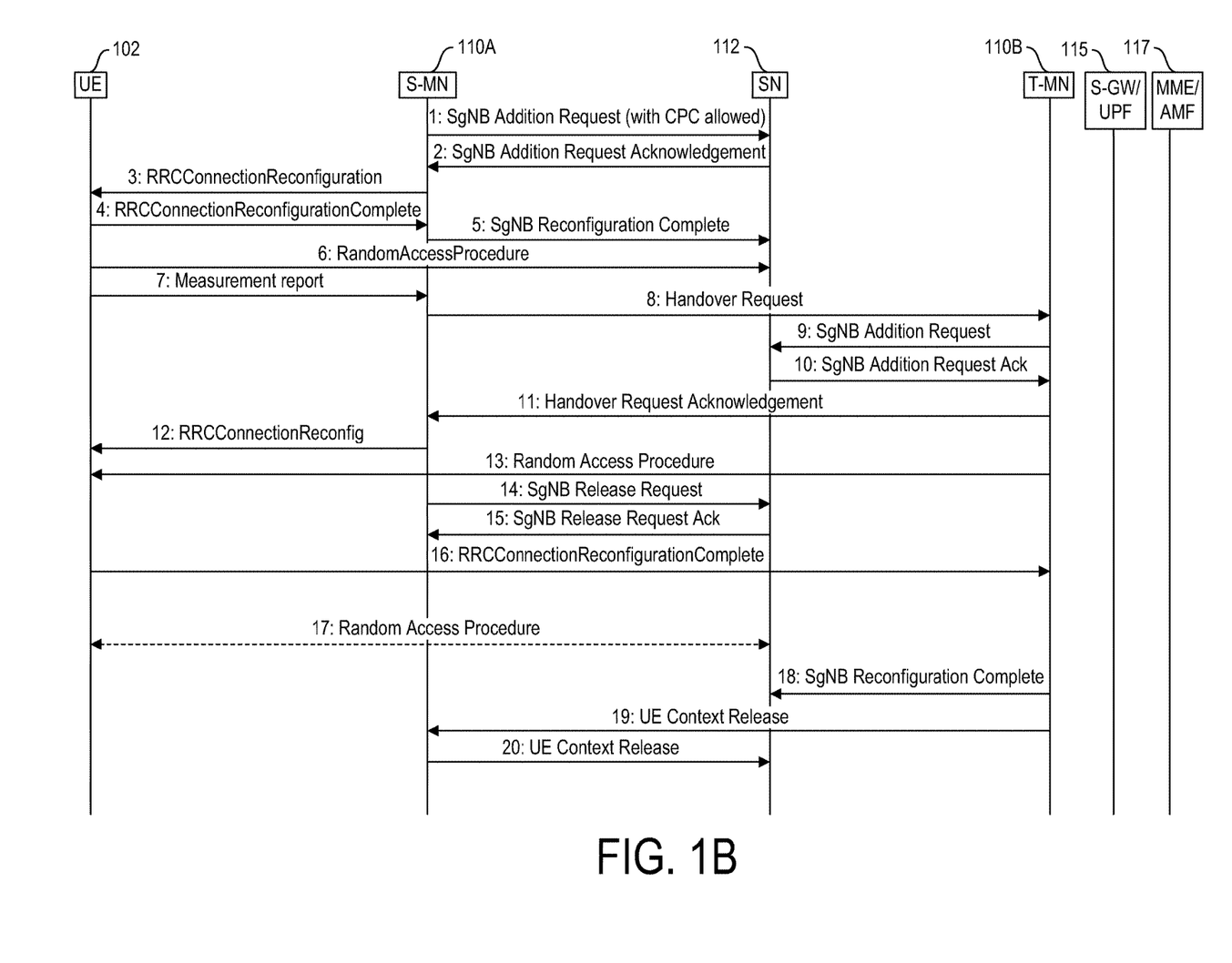

FIG. 1B depicts an example of a signaling diagram, in accordance with some example embodiments. FIG. 1B is similar in some respects to FIG. 1A but FIG. 1B depicts the case where the message at 1 allows CPC at the secondary node 112.

At 1, the source master node 110A may send to at least one target master node 110B a message such as request message (e.g., the "SgNB Addition Request") including CHO related information, which in this example is an indication that CPC is allowed at the secondary node 112.

At 2, the secondary node 112 may send to the source master node 110A an acknowledgement message (e.g., the "SgNB Addition Request Acknowledgement"), in accordance with some example embodiments. The message at 2 may be the same or similar to message 2 noted above with respect to FIG. 1A.

At 8, the source master node 110A may send a handover request to the target master node 110B and, in particular a legacy master node handover request without a change in the secondary node 112 (e.g., the secondary node 112 remains the same before and after the handover to target master node 110B). The master node shall not use a conditional handover since the secondary node is allowed to trigger CPC at any time which would collide with the CHO at the master node, so the master node can only use a legacy handover procedure.

At 9, the master node 110B may send to the secondary node 112 a message such as request message (e.g., the "SgNB Addition Request") including an indication to stop CPC (e.g., not initiate or stop an ongoing CPC) at the secondary node 112. At 10, the secondary node 112 may send to master node 110B an acknowledgement message (e.g., the "SgNB Addition Request Acknowledgement"), in accordance with some example embodiments. The message at 10 may be the same or similar to message 2 noted above with respect to FIG. 1A.

Figure 1C:
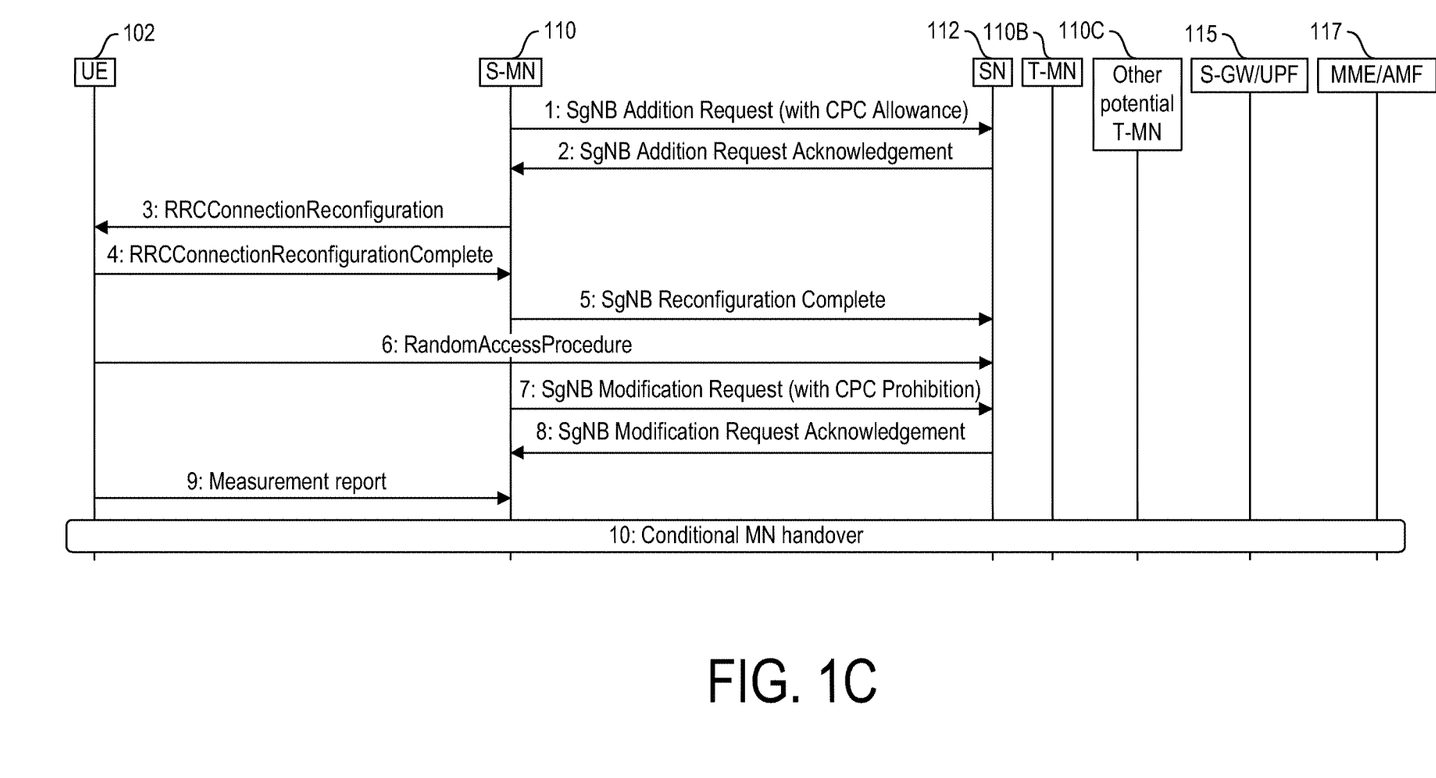

FIG. 1C depicts an example of a signaling diagram for a modification request, in accordance with some example embodiments. The process at FIG. 1C is similar in some respects to 3GPP, 37.340, where a secondary node addition procedure such as a SgNB modification procedure is described but FIG. 1B further includes messages extended as noted herein to enable coordination between CPC and CHO.

At 1, the source master node 110A may send to at least one target master node 110B a message such as request message (e.g., the "SgNB Addition Request") including CHO related information, which in this example is an indication that CPC is allowed at the secondary node 112. Alternatively, or additionally, the CHO related information may contain an indication to stop an ongoing CPC process.

At 2, the secondary node 112 may send to the source master node 110A an acknowledgement message (e.g., the "SgNB Addition Request Acknowledgement"), in accordance with some example embodiments. The message at 2 may be the same or similar to message 2 noted above with respect to FIG. 1A.

At 7, the source master node 110A may send to the secondary node 112 a message such as request message (e.g., the "SgNB Modification Request") including CHO related information, which in this example is an indication that CPC is prohibited at the secondary node 112. In this example, the secondary node was initially allowed to perform a CPC with message 1, but later modified to prohibit CPC with message 7.

At 8, the secondary node 112 may send to the source master node 110A an acknowledgement message (e.g., the "SgNB Modification Request Acknowledgement"), in accordance with some example embodiments. The acknowledgement message may acknowledge the request so that the source node knows the secondary knows agrees to the request to prohibit CPC, or the acknowledgement message may indicate a rejection of the request to prohibit CPC (e.g., fail to respond within a certain time period, indicate a rejection, indicate a cause code (e.g., reason for the rejection). As in FIG. 1A, the master node can initiate a conditional handover since the secondary node will not use CPC.

Figure 1D:
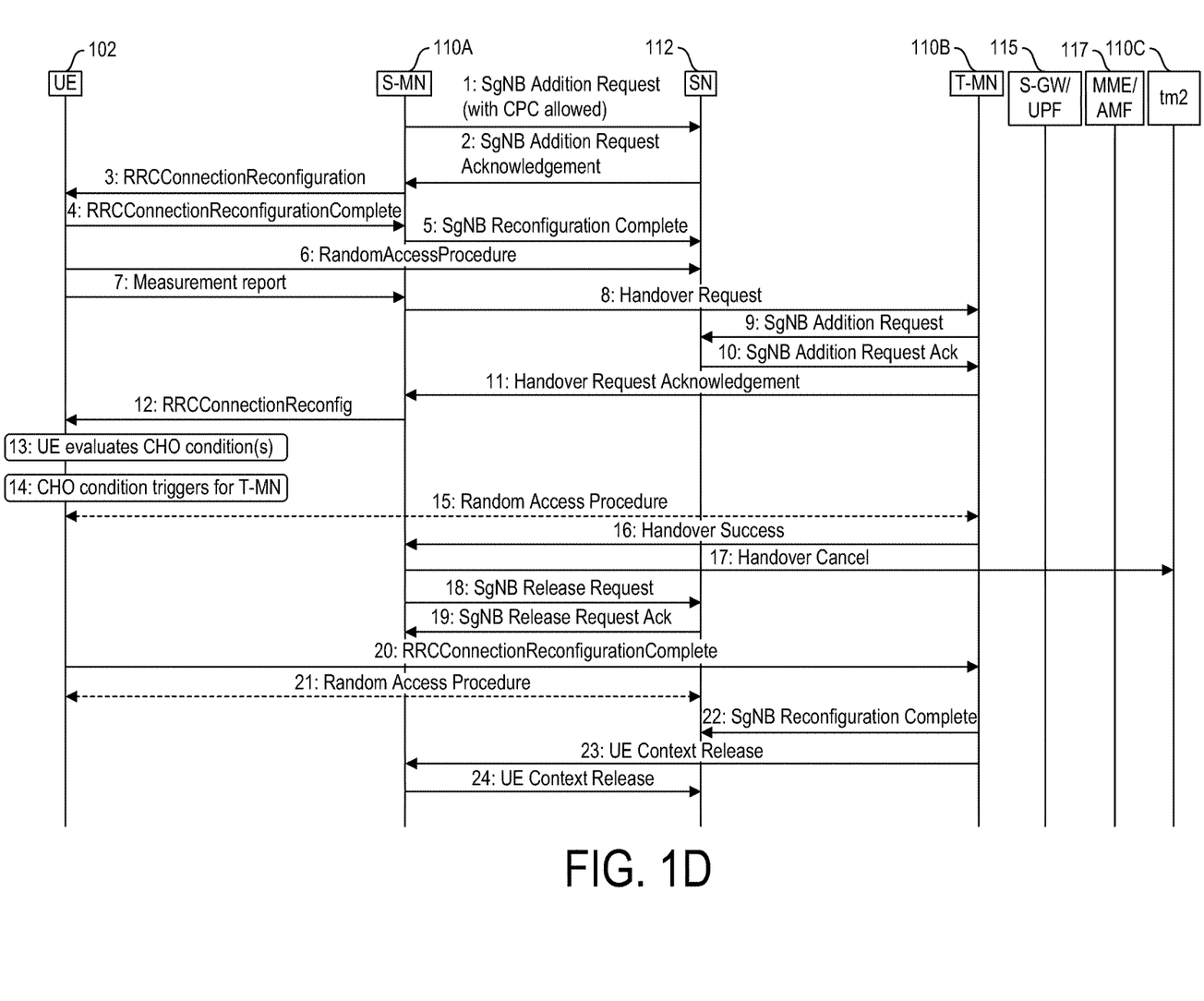

FIG. 1D depicts an example when the addition request is used during an ongoing conditional handover process. FIG. 1D is very similar to FIG. 1A. However, at 1, the source master node 110A may send to the secondary node a message "SgNB Addition Request"), that CPC is allowed. At 8, the source master node decides to initiate a CHO although it has allowed the CPC in the secondary node. In order to avoid extra signaling though sending a modification request as in FIG. 1C, it initiates the CHO. As part of this CHO process, the target master node 110B sends an addition request at 9 to the secondary node 112. The target may extend this message with CHO related information which causes the secondary node to stop the ongoing CPC (if it was initiated previously), prohibit CPC for the future, and/or prohibit CPC until a timer expires or another event occurs (e.g. the SgNB Release Request in 18).

Figure 2A:
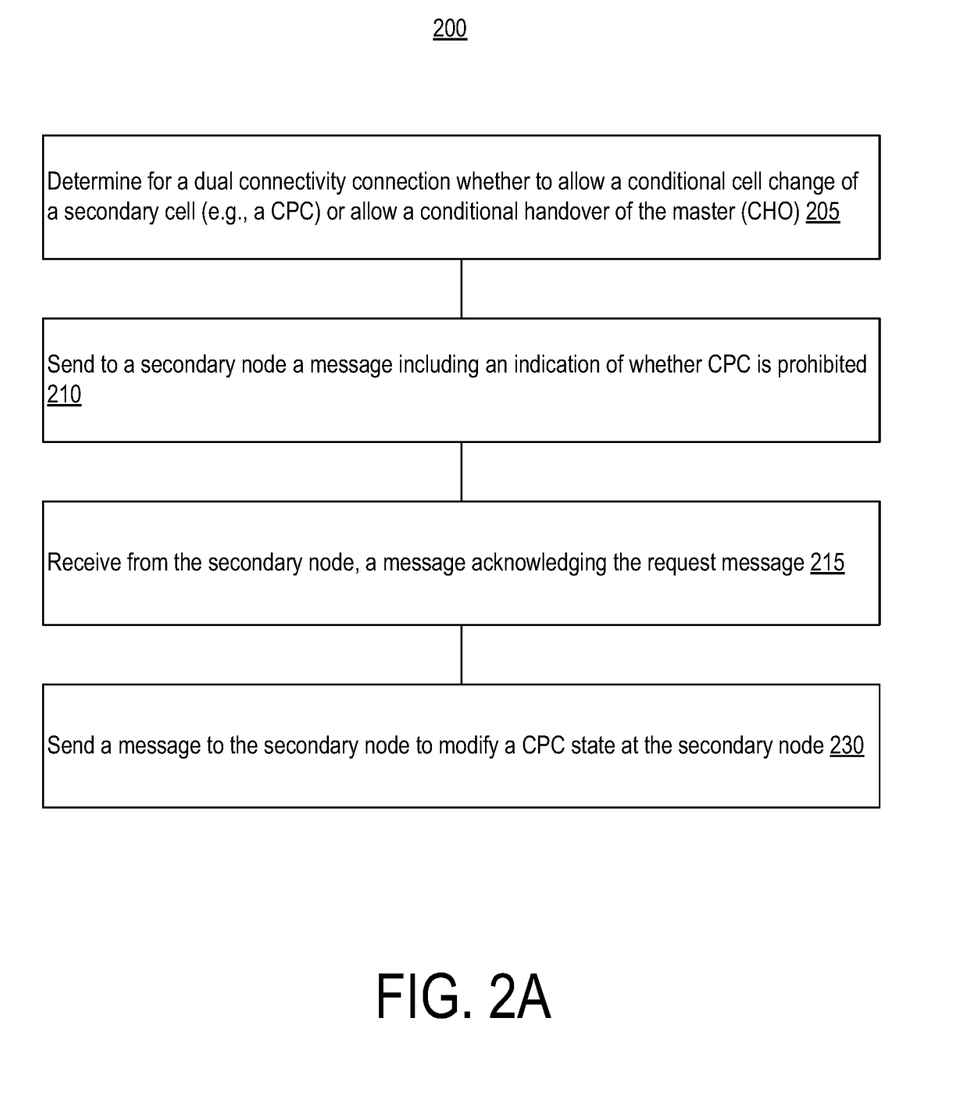
FIGS. 2A-2B depict examples of processes for a conditional handover, in accordance with some example embodiments.

FIG. 2A depicts an example of a process 200, in accordance with some example embodiments.

At 205, a master node, such as source master node 110A or target node 110B, may determine for a dual connectivity connection whether to allow a conditional cell change of a secondary cell (e.g., a CPC) or allow a conditional handover of the master (CHO). For example, if the UE 102 is closer to a master node boundary (where perhaps another candidate target master node may be better suited to serve the UE) the source master node may allow CHO but disable CPC at a secondary node. Alternatively for example, if the UE 102 is closer to a secondary node boundary (where perhaps another secondary nodes may be better suited to serve the UE) the source master node may disable CHO but allow CPC at a secondary node. This determination may be specific to a dual connectivity connection including a master node and at least one secondary node both coupled in dual connectivity to the UE.

At 210, a master node, such as source master node 110A or target node 110B, may send to a secondary node, such as secondary node 112, a message including an indication of whether CPC is prohibited. This message may be in the form of a request message or a modification message, such as the noted SgNB Addition Request and SgNB Modification Request. Moreover, this message may be sent during the CHO process to enable dynamic coordination of CPC and CHO. For example, the message may indicate to the secondary node that CPC is allowed (in which case a CHO should not be used), a CPC is prohibited (in which case a CHO can be used), and/or CPC is stopped (e.g., an ongoing CPC is stopped to enable a CHO to proceed). In some embodiments, the message prohibits CPC or allows CPC temporarily. For example, the prohibition (or allowance) of CPC at a secondary node may be for a given time period, after which CPC is allowed to be used again. Likewise, the indication prohibiting CPC may trigger a timer, after the expiry of which CPC is allowed again. As noted, an event (e.g., the reception of a secondary node release message after a master node handover from a source master node) may cause the time period to expire as well.

At 215, the master node, such as source master node 110A or target node 110B, may receive from the secondary node, such as secondary node 112, a message acknowledging the request message. For example, the secondary node 112 may send to the master node an acknowledgement message indicating that the secondary node accepts the CPC prohibition or indicating that the CPC prohibition is rejected (in which case the secondary node may use CPC despite the request to prohibit). In some embodiments, the receiving of an acknowledgment is passive in the sense by not sending a rejection to the master node, the master node is receiving an acknowledgement from the other node.

At 230, the master node, such as source master node 110A or target node 110B, may send a message to the secondary node, such as secondary node 112, to modify (e.g., update, change, etc.) a CPC state at the secondary node. For example, the message may modify the CPC prohibition (which was previously requested) at the secondary node to allow the CPC. Alternatively, the message may modify the CPC allowed at the secondary node to prohibit CPC.

Figure 2B:
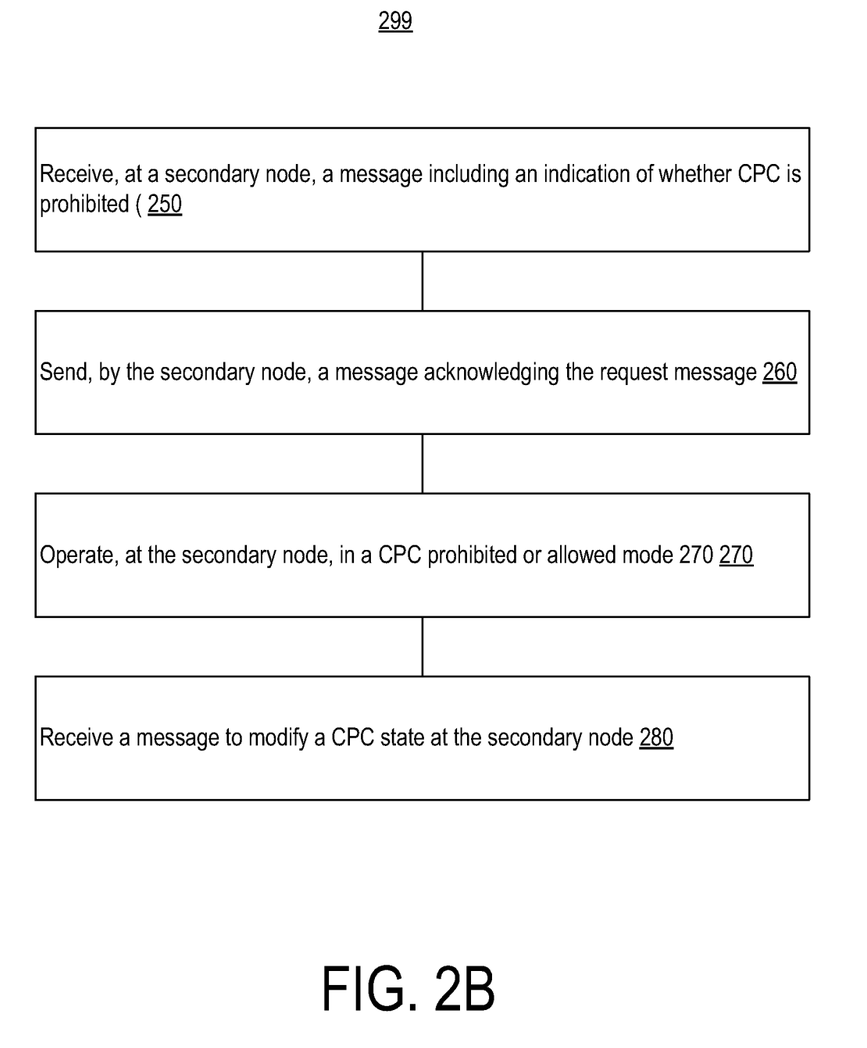

FIG. 2B depicts an example of a process 299, in accordance with some example embodiments.

At 250, a secondary node, such as secondary node 112, may receive from a master node, such as source master node 110A or target node 110B, a message including an indication of whether CPC is prohibited. This message may be the same or similar message noted at 205.

At 260, a secondary node, such as secondary node 112, may send to a master node, such as source master node 110A or target node 110B, a message acknowledging the message received at 250. For example, the secondary node 112 may send to the master node an acknowledgement message indicating that the secondary node accepts the CPC prohibition or indicating that the CPC prohibition is rejected (in which case the secondary node may use CPC despite the request to prohibit). In some embodiments, the sending of an acknowledgment is passive in the sense by not sending a rejection to the master node, the secondary node is implicitly sending the acknowledgement to the master node.

At 270, the secondary node may operate in accordance with CPC prohibition or allow CPC based on the request message at 250. In the case of CPC prohibition, this may be temporary as noted. Moreover, the CPC prohibition enables the CHO of the master node.

At 280, a secondary node, such as secondary node 112, may receive from a master node, such as source master node 110A or target node 110B, a message to modify (e.g., update, change, etc.) a CPC state at the secondary node. For example, the message may modify the CPC prohibition (which was previously requested) at the secondary node to allow the CPC. Alternatively, the message may modify the CPC allowed at the secondary node to prohibit CPC. The secondary node may accept or reject this modification by acknowledging, for example the request as noted at 260. And, the secondary node may then proceed to operate in accordance with the modified CPC state.

Figure 3:
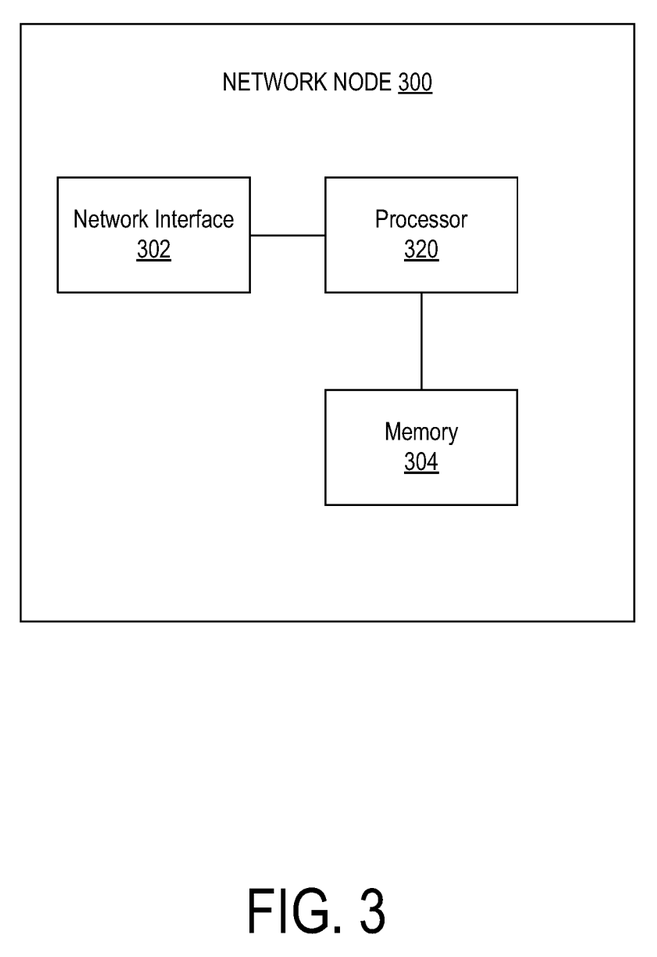
FIG. 3 depicts an example of a network node, in accordance with some example embodiments.

FIG. 3 depicts an example of a network node 330, in accordance with some example embodiments. In some example embodiments, the network node 300 may be implemented to provide a master node, secondary node, a core network node, and/or the like. As noted, the network node may be implemented in a base station (e.g., an evolved node B base station, 5G base station (gNB)) or at any other network node in the access network or packet core, such as the evolved packet core of 5G core.

In some example embodiments, the network node 300 implements the process disclosed herein to enable coordination of CPC and CHO (see, e.g., FIGS. 1A-1D and FIGS. 2A-B). The network node 300 may include a network interface 302, at least one processor 320, and at least one memory 304, in accordance with some example embodiments. The network interface 302 may include wired and/or wireless transceivers to enable access other nodes including base stations, a data network such as the Internet, core network nodes, and/or other nodes. The memory 304 may comprise volatile and/or non-volatile memory including program code, which when executed by at least one processor 320 provides, among other things, the processes disclosed herein with respect to the network node.

Figure 4:
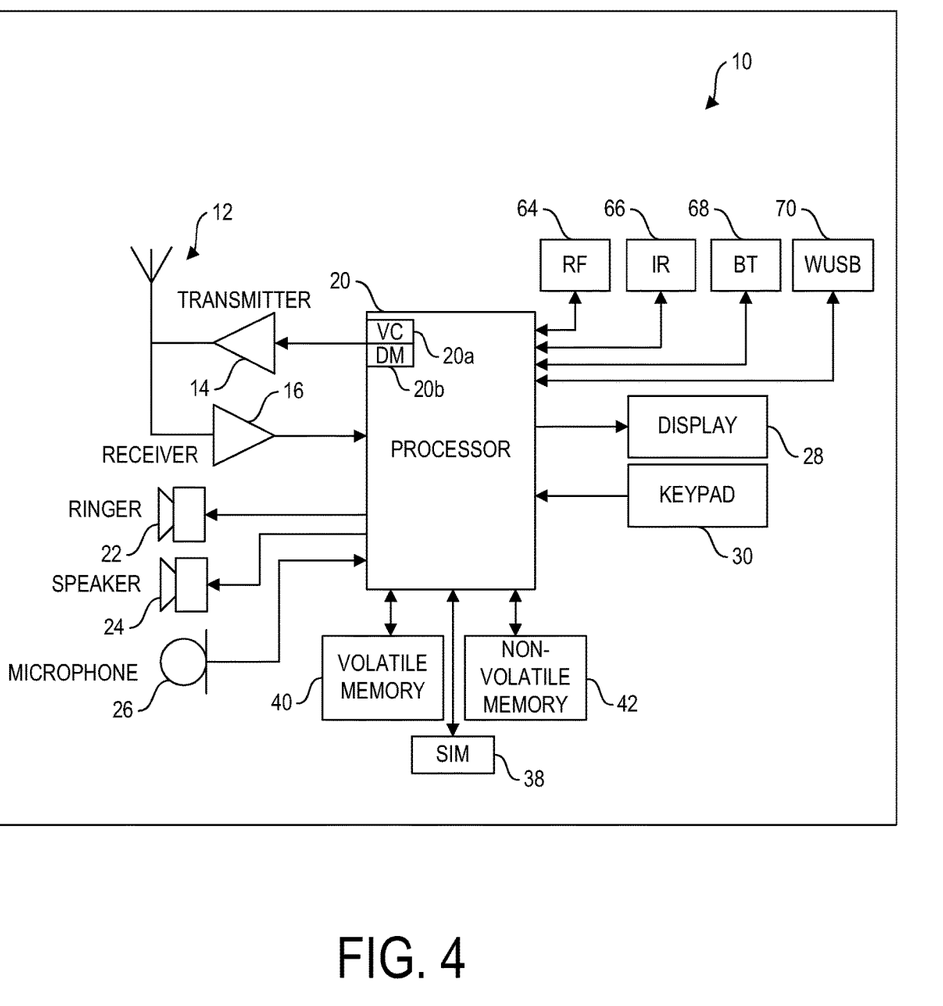
FIG. 4 depicts an example of an apparatus, in accordance with some example embodiments.

FIG. 4 illustrates a block diagram of an apparatus 10, in accordance with some example embodiments.

The apparatus 10 may represent a user equipment, such as a wireless device, although certain aspects of the apparatus 10 may be used to implement a network node, such as a base station or other type of network node.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 4 as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 4, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWPAN, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to control and/or provide one or more aspects disclosed herein. For example, the processor 20 may be configured using computer code stored at memory 40 and/or 42 to provide one or more aspects described above including aspects of the processes discloses herein.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 4, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be enhanced coordination of handovers.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. An apparatus comprising:
   at least one processor; and
   at least one memory including computer program code, the at least one memory and the computer program code configured to, with the at least one processor, cause the apparatus to at least:
   initiate by a master node, which is a configured with a secondary node as part of dual connectivity, a conditional handover to a target master node including a secondary node change, the initiating causing the target master node to send a secondary node addition request message, the secondary node addition request message indicating that addition of the secondary node is associated with the conditional handover of the master node.

2. The apparatus of claim 1, wherein the apparatus comprises, or is comprised in, the master node, and wherein the master node and the secondary node both serve at least one user equipment in the dual connectivity.

3. The apparatus of claim 1, wherein the apparatus is further configured to cause the target master node to further send a secondary node modification request message.

4. The apparatus of claim 3, wherein the secondary node modification request message or the secondary node addition request message is sent during the conditional handover between the master node and a target master node, the secondary node modification request message or the secondary node addition request message enabling a dynamic coordination of the conditional handover and a conditional cell change.

5. The apparatus of claim 3, wherein the secondary node modification request message or the secondary node addition request message includes a first indication that a conditional cell change is prohibited, a second indication of allowing the conditional cell change, and/or a third indication of stopping the conditional cell change, wherein the conditional cell change comprises a change of at least one cell served by the secondary node.

6. The apparatus of claim 3, wherein the secondary node modification request message or the secondary node addition request message includes an indication of whether the conditional cell change is prohibited or allowed is for a time period defined to end at an expiry of the time period or at an event.

7. The apparatus of claim 3, wherein the secondary node modification request message or the secondary node addition request message modifies a state of the secondary node to prohibit the conditional cell change, allow the conditional cell change, and/or stop the conditional cell change.

8. The apparatus of claim 1, wherein the secondary node sends an acknowledgment indicating that the node accepts a prohibition of the conditional cell change or rejects the prohibition.

9. The apparatus of claim 1, wherein the apparatus is further caused to at least determine whether to allow the conditional handover of the master node.

10. An apparatus comprising:
at least one processor; and
at least one memory including computer program code, the at least one memory and the computer program code configured to, with the at least one processor, cause the apparatus to at least:
receive, from a target master node and by a secondary node, which is a configured with a master node as part of dual connectivity, a secondary node addition request message, the secondary node addition request message indicating that addition of the secondary node is associated with a conditional handover of the master node; and
send, in response to the secondary node addition request message being received, an acknowledgment.

11. The apparatus of claim 10, wherein the apparatus is further caused to at least operate in a conditional cell change prohibited state or a conditional cell change allowed state based on the received secondary node addition request message and/or the sent acknowledgment.

12. The apparatus of claim 10, wherein the apparatus comprises, or is comprised in, the secondary node, and wherein the master node and the secondary node both serve a user equipment in the dual connectivity.

13. The apparatus of claim 10, wherein the apparatus is further configured to receive a secondary node modification request message.

14. The apparatus of claim 13, wherein the secondary node addition request message or the secondary node modification request message is sent during the conditional handover between the master node and the target master node, the secondary node addition request message or the secondary node modification request message enabling a dynamic coordination of the conditional handover and the conditional cell change.

15. The apparatus of claim 13, wherein the secondary node modification request message or the secondary node addition request message includes a first indication that the conditional cell change is prohibited, a second indication of allowing the conditional cell change, and/or a third indication of stopping the conditional cell change, wherein the conditional cell change comprises a change of at least one cell served by the secondary node.

16. The apparatus of claim 13, wherein the secondary node modification request message or the secondary node addition request message includes an indication of whether the conditional cell change is prohibited or allowed is for a time period defined to end at an expiry of the time period or at an event.

17. The apparatus of claim 13, wherein the secondary node modification request message or the secondary node addition request message modifies a state of a secondary node to prohibit the conditional cell change, allow the conditional cell change, and/or stop the conditional cell change.

18. The apparatus of claim 10, wherein the acknowledgment indicates that the secondary node accepts a prohibition of the conditional cell change or rejects the prohibition.

19. A method comprising:
initiating by a master node, which is a configured with a secondary node as part of dual connectivity, a conditional handover to a target master node including a secondary node change, the initiating causing the target master node to send a secondary node addition request message, the secondary node addition request message indicating that addition of the secondary node is associated with the conditional handover of the master node.

20. A method comprising:
receiving, from a target master node and by a secondary node, which is a configured with a master node as part of dual connectivity, a secondary node addition request message, the secondary node addition request message indicating that addition of the secondary node is associated with a conditional handover of the master node; and
sending, in response to receiving the secondary node addition request message, an acknowledgment.

* * * * *